(12) United States Patent
Schramek

(10) Patent No.: US 6,578,001 B1
(45) Date of Patent: Jun. 10, 2003

(54) SYSTEM AND METHOD OF REDUCING UNEXPENDED WARRANTY COSTS

(75) Inventor: Joseph E Schramek, Dearborn Heights, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/531,640

(22) Filed: Mar. 21, 2000

(51) Int. Cl.[7] .......................... G06F 17/60; G06F 17/30
(52) U.S. Cl. .................. 705/1; 707/7; 707/5; 705/7
(58) Field of Search ............................ 707/1–7, 102, 707/104; 705/1, 7–10

(56) References Cited

U.S. PATENT DOCUMENTS

| | | | | |
|---|---|---|---|---|
| 5,537,586 A | * | 7/1996 | Amram et al. | 395/600 |
| 5,734,890 A | * | 3/1998 | Case et al. | 395/605 |
| 5,826,260 A | * | 10/1998 | Byrd, Jr. et al. | 707/5 |
| 5,842,218 A | * | 11/1998 | Robinson | 707/102 |
| 5,963,939 A | * | 10/1999 | McCann et al. | 707/4 |
| 6,208,853 B1 | * | 3/2001 | LoVasco et al. | 455/414 |
| 6,289,340 B1 | * | 9/2001 | Puram et al. | 707/5 |
| 6,347,302 B1 | * | 2/2002 | Joao | 705/4 |

FOREIGN PATENT DOCUMENTS

EP 0 965 949 A2 * 12/1999 ............ G07C/1/00

OTHER PUBLICATIONS

Deierlein, Warranty Recovery: An Economic Necessity, Jun. 1997, Fleet Equipment v23n6, pp. 60–63.*

* cited by examiner

Primary Examiner—James P. Trammell
Assistant Examiner—Mary Wang
(74) Attorney, Agent, or Firm—F. G. McKenzie

(57) ABSTRACT

The present invention involves a system and method of reducing allocated vehicle warranty costs from a stored historical repair database of repairs wherein the database contains information related to repair areas, repair costs, and repair descriptions. The method includes inputting the information into the database for subsequent downloading. The method further includes downloading the information into a file of a computer-based program from the database, ranking the information by repair cost, and sorting the ranked information by repair area to define groups of repair areas having repairs ranked by cost. The method further includes identifying within each group of repair areas those repair descriptions having a relatively high cost within each respective group so that work to be performed on the repairs may be prioritized in accordance with the ranking in order to reduce the warranty costs.

17 Claims, 4 Drawing Sheets

|  |  | Gross Sales | | Total Warranty | |
|---|---|---|---|---|---|
|  |  | Units | Cost ($) | Units | Cost ($) |
| F87Z | 1104CA HUB ASY - WHEEL | 24,296 | $3,731,966 | 10,252 | $1,561,758 |
| F7DZ | 1125AA ROTOR ASY | 41,042 | $1,889,915 | 29,913 | $1,371,921 |
| F87Z | 1125BA ROTOR ASY | 49,444 | $2,962,282 | 21,305 | $1,260,631 |
| F8UZ | 2C286ARM CONTROL ASY - ABS HYDRAULICS | 16,913 | $4,252,044 | 4,162 | $1,047,277 |
| F5AZ | 1125CA ROTOR ASY | 72,202 | $3,777,976 | 19,761 | $1,028,080 |
| F5RZ | 1125A DISC - BRAKE | 51,479 | $2,761,571 | 17,314 | $926,308 |
| XL2Z | 2001BA KIT - BRAKE SHOE | 144,510 | $5,285,432 | 19,795 | $756,281 |
| XL3Z | 1125CB ROTOR ASY | 19,843 | $1,485,476 | 9,269 | $701,590 |
| F58Z | 1125BB ROTOR ASY | 32,119 | $1,910,976 | 11,323 | $664,881 |
| F81Z | 1125BA ROTOR ASY | 12,660 | $1,093,571 | 7,653 | $661,052 |
| F5TZ | 1104ED HUB ASY - WHEEL | 3,999 | $951,120 | 2,397 | $569,964 |
| F4DZ | 2C026A DISC -BRAKE | 35,353 | $2,112,374 | 8,435 | $558,449 |
| XL1Z | 2001A KIT - BRAKE SHOE | 88,011 | $2,718,572 | 17,509 | $553,224 |
| F3DZ | 1125AA ROTOR ASY | 27,165 | $1,691,179 | 8,437 | $515,530 |
| XL3Z | 2C026A ROTOR-RR WHL DISC BRK | 29,395 | $1,549,128 | 9,599 | $505,632 |
| F7RZ | 1102EC HUB ASY - WHEEL | 15,089 | $1,279,291 | 5,688 | $493,747 |
| F6TZ | 2C218AA MODULATOR | 1,374 | $577,794 | 1,079 | $453,743 |
| XL2Z | 2598C BRAKE ASSY - PARKING | 2,854 | $2,283,856 | 559 | $447,328 |
| F4UZ | 2C2198A CONTROL | 1,707 | $568,807 | 1,226 | $408,530 |
| F81Z | 1102A HUB ASY -WHEEL | 13,578 | $1,165,427 | 4,259 | $380,062 |
| F48Z | 2C026CA DISC - BRAKE | 10,749 | $773,825 | 5,358 | $369,314 |
| F88Z | 1126A DISC-FRT WHL BRK (FULL CAST) | 20,749 | $1,058,069 | 7,063 | $367,642 |
| F81Z | 2001SA KIT - BRAKE SHOE | 93,940 | $2,995,597 | 11,212 | $363,858 |
| F85Z | 1125DA ROTOR ASY | 8,183 | $685,794 | 4,262 | $382,483 |
| F2CZ | 2001AAKIT - BRAKE SHOE | 68,299 | $2,535,523 | 9,466 | $360,633 |
| F8RZ | 1126A DISC ASSY | 18,518 | $995,113 | 6,624 | $354,987 |

Fig. 3

| Major Area | Costs ($) | Ranking Repairs | Labor Standard Operation/Description | Repairs | Cost ($) | Average Cost ($)/Repair |
|---|---|---|---|---|---|---|
| *Brakes* | | | | *892,379* | *$40,717,723* | *$46* |
| Brakes | 19 | 46 | 1102FPT - Disc Brake Rotor - Front machine on Vehicle Machine | 103,426 | $6,810,723 | $66 |
| Brakes | 23 | 41 | 2001AF - Brake Shoes/Pad Assemblies - Hydraulic Remove And Install | 119,500 | $5,311,425 | $44 |
| Brakes | 25 | 43 | 2001A25PT - Disc Brake Rotor Front Machine On Vehicle Machine | 118,094 | $4,900,564 | $41 |
| Brakes | 31 | 67 | 2001AT - Brake Shoes/Pad Assemblies - Hydraulic Remove And Install | 51,872 | $4,161,406 | $80 |
| Brakes | 37 | 49 | 2219D - Anti-Lock Brake System Diagnosis | 91,773 | $3,312,151 | $36 |
| Brakes | 60 | 102 | 2001AB - Brake Shoes/Pad Assemblies - Hydraulic Remove And Install | 37,112 | $2,158,938 | $58 |
| Brakes | 77 | 181 | 2001ACT - Brake Shoes/Pad Assemblies - Hydraulic Remove And Install | 20,701 | $1,658,809 | $80 |
| Brakes | 81 | 134 | 2001AFA - Brake Shoes/Pad Assemblies - Hydraulic Remove And Install | 31,686 | $1,614,722 | $51 |
| Brakes | 105 | 138 | 1102BT - Disc Brake Rotor - Front Replace | 30,631 | $1,311,740 | $43 |
| Brakes | 106 | 185 | 1102GPT - Disc Brake Rotor- Rear Machine On Vehicle Machine | 20,107 | $1,301,468 | $65 |
| Brakes | 151 | 157 | 2001A26PT - Disc Brake Rotor - Rear Machine On Vehicle Machine | 25,601 | $964,095 | $38 |
| Brakes | 171 | 193 | 2001B2PT - Disc Brake Rotor Front Machine On Vehicle Machine | 19,061 | $830,417 | $41 |
| Brakes | 185 | 85 | 2219DXV - Road Test | 43,821 | $749,869 | $17 |
| Brakes | 197 | 130 | 2001A5FT - Disc Brake Rotor Replace | 32,182 | $690,471 | $21 |
| Brakes | 199 | 274 | 1126BT - Brake Drum - Rear Machine | 11,965 | $681,709 | $57 |
| Brakes | 208 | 75 | 2219D13 - Pin Point Test Diagnosis | 46,577 | $658,670 | $14 |
| Brakes | 217 | 249 | 2219D6 - Module - Anti Lock Replace | 13,601 | $631,326 | $46 |
| Brakes | 224 | 297 | 2001ABB - Brake Shoes/Pad Assemblies - Hydraulic Remove And Install | 11,008 | $597,020 | $54 |
| Brakes | 238 | 256 | 2780A - Parking Brake Control Replace | 13,091 | $568,353 | $43 |
| Brakes | 249 | 187 | 2001A7T - Brake Drum Machine | 19,910 | $535,435 | $27 |
| Brakes | 279 | 320 | 2140A - Master Cylinder Remove - And Install Or Replace | 9,520 | $440,241 | $46 |
| Brakes | 292 | 380 | 2219D11 - Solenoid Valve Block/HCU Replace | 7,310 | $414,654 | $57 |
| Brakes | 294 | 243 | 2001BF - Brake Shoes/Pad Assemblies - Hydraulic Inspect | 13,830 | $413,093 | $30 |

*Fig. 4*

| Ranking | Area | Service Part# | Basic Part# | Part Name | | Part Cost ($) | Total Warranty | | | Gross Sales | | | Supplier Code |
|---|---|---|---|---|---|---|---|---|---|---|---|---|---|
| | | | | | | | Units | Cost ($) | | Units | Cost ($) | | |
| | | Chassis Brakes, Ride & Handling and Steering Grand Total All Parts | | | | | 2,295,881 | $115,944,786 | | 8,975,518 | $461,155,176 | | |
| | | - Top 300 Chassis Sub-Total | | | | | 1,620,936 | $85,163,351 | | 4,363,320 | $246,764,396 | | |
| | | - Top 300 Chassis % of Total | | | | | 73% | 73% | | 49% | 54% | | |
| | *Brakes Total* | | | | | | | | | | | | |
| 6 | Brakes | F7DZ1125AA | 1125 | Rotor Asy | | $68 | 529,695 | $36,213,249 | | 2,135,615 | $129,526,187 | | |
| 9 | Brakes | F6Z1125BA | 1125 | Rotor Asy | | $46 | 29,913 | $1,371,921 | | 41,042 | $1,889,915 | | UOWRC |
| 13 | Brakes | F5AZ1125CA | 1125 | Rotor Asy | | $59 | 21,305 | $1,260,631 | | 49,444 | $2,962,282 | | S4U8K |
| 15 | Brakes | F5RZ1125A | 1125 | Disc - Brake | | $52 | 19,761 | $1,028,080 | | 72,202 | $3,777,976 | | UOWRC |
| 21 | Brakes | XL3Z1125CB | 1125 | Rotor Asy | | $54 | 17,314 | $926,308 | | 51,479 | $2,761,571 | | 0120A |
| 24 | Brakes | F56Z1125BB | 1125 | Rotor Asy | | $76 | 9,269 | $701,590 | | 19,843 | $1,485,476 | | S4UBII |
| 26 | Brakes | F8IZ1125BA | 1125 | Rotor Asy | | $59 | 11,323 | $664,881 | | 32,119 | $1,910,976 | | UOWRC |
| 36 | Brakes | XL1Z1125AA | 1125 | Rotor Asy | | $86 | 7,653 | $661,052 | | 12,660 | $1,093,571 | | UOWRC |
| 54 | Brakes | F4SZ1125A | 1125 | Disc - Frt Whl Brk (Full Cast) | | $61 | 8,437 | $515,530 | | 27,165 | $1,691,179 | | UOWRC |
| 58 | Brakes | FF81Z1125DA | 1125 | Rotor Asy | | $52 | 7,063 | $367,642 | | 20,122 | $1,058,059 | | UOWRC |
| 60 | Brakes | F2CZ1125A | 1125 | Disc Assy | | $85 | 4,262 | $362,483 | | 8,183 | $695,794 | | UOWRC |
| 61 | Brakes | F8RZ1125CA | 1125 | Disc - Brake | | $54 | 6,624 | $354,987 | | 18,516 | $995,113 | | UOWRC |
| 70 | Brakes | F8LZ1125AA | 1125 | Rotor Asy | | $54 | 6,523 | $354,618 | | 8,742 | $476,284 | | 0120A |
| 75 | Brakes | F8DZ1125AA | 1125 | Rotor Asy | | $53 | 6,238 | $327,496 | | 8,755 | $461,679 | | UOWRC |
| 82 | Brakes | F10Y1125B | 1125 | Dsc - Frt And Rrbrk | | $52 | 6,140 | $320,472 | | 9,501 | $519,424 | | UOWRC |
| 89 | Brakes | F8YZ1125AA | 1125 | Rotor Asy | | $70 | 4,262 | $298,524 | | 9,032 | $684,429 | | UOWRC |
| 135 | Brakes | F8RZ1125EA | 1125 | Rotor Asy | | $52 | 5,486 | $287,945 | | 19,572 | $1,034,268 | | V300J |
| 181 | Brakes | F4Z71125A | 1125 | Rotor Asy | | $54 | 3,643 | $195,010 | | 5,202 | $276,734 | | 0120A |
| 240 | Brakes | F6DZ1125B | 1125 | Disc - Frt Whl Brk(Full Cast) | | $52 | 2,831 | $146,941 | | 5,620 | $292,123 | | UOWRC |
| | Brakes | | 1125 Total | | | $51 | 2,165 | $111,435 | | 4,397 | $230,898 | | UOWRC |
| | Brakes | XL2Z2001BA | 2001 | Kit - Brakeshoe | | $57 | 180,212 | $10,257,547 | | 423,996 | $24,297,760 | | UOWRC |
| 19 | Brakes | | | | | $38 | 19,795 | $756,281 | | 144,510 | $5,295,432 | | V718P |

*Fig. 5*

SYSTEM AND METHOD OF REDUCING UNEXPENDED WARRANTY COSTS

TECHNICAL FIELD

The present invention relates to a system and method of reducing allocated vehicle warranty costs from a stored historical repair database containing information related to repair areas, repair costs, and repair descriptions.

BACKGROUND ART

Automotive manufacturers maintain allocated or unexpended warranty reserves which hold an amount of allocated reserves for manufactured vehicles during a predetermined time period or mile usage in which the vehicles are warrantied. An unexpended warranty covers repairs involving labor costs and part costs of a warrantied vehicle. One purpose of the unexpended warranty reserve is to provide the customers with adequate service and parts during the predetermined time period or mileage usage without charging the customer. Such unexpended warranty reserves include enormous amounts of money. Such reserves may amount to millions or billions of dollars annually.

The amount of the unexpended vehicle warranty for vehicle models is annually determined by considering historical costs of warrantied services and parts of previous respective vehicle models. The amount of the unexpended vehicle warranty for a given year is directly affected by the historical costs of previous vehicle models. Thus, reducing the costs of warrantied services and parts reduces the amount of a subsequent unexpended vehicle warranty to be allocated.

As historical repair information significantly affects the allocations made toward subsequent unexpended warranties, improvements made on such repairs would also significantly affect the allocations thereof.

Thus, what is needed is an improved method of reducing vehicle warranty costs from historical repair information in order to reduce an unexpended warranty reserve.

What is also needed is an improved method of reducing money allocated for warranty reserves.

DISCLOSURE OF INVENTION

A specific object of the invention is to provide for an improved method of reducing allocated vehicle warranty costs from a stored historical repair database containing information related to repair areas, repair descriptions, and repair costs. The method includes downloading the information into a computer-based program from the database and ranking the information by repair cost. The method further includes sorting the information by repair area to define repair area groups having repairs ranked by cost. The method further includes identifying within each group of repair areas those repair descriptions having a relatively high cost within each respective group so that work to be performed on the repairs may be prioritized in accordance with the ranking in order to reduce the warranty costs.

Another specific object of the invention is to provide for an improved method of reducing allocated vehicle warranty costs from a stored historical repair database containing information related to repair areas, repair descriptions, and repair costs. The method includes downloading the information into a computer-based program from the database and sorting the information by repair area to define groups of repair areas. The method further includes ranking by repair costs those repair descriptions within each repair area group and identifying within each group of repair areas those repair descriptions having relatively high costs within each respective group so that work to be performed on the repairs may be prioritized in accordance with the ranking in order to reduce the warranty cost.

Yet another specific object of the invention is to provide an improved system for reducing allocated vehicle warranty costs from a stored historical repair database containing information related to repair areas, repair descriptions, and repair costs. The system comprises a mechanism for downloading the information into a computer-based program from the database, a mechanism for ranking the information by repair cost, and a mechanism for sorting the ranked information by repair area to define groups of repair areas having repairs ranked by cost. The system further includes a mechanism for identifying within each group of repair area those repair descriptions having relatively high costs within each respective group so that work to be performed on the repairs may be prioritized in accordance with the ranking to reduce the warranty costs.

Determining the repairs that result in relatively high costs and reducing such costs results in a significant reduction of money allocated in unexpended warranties. Aimed toward a multiplicity of repairs having relatively high costs, the unexpended warranty reserve is significantly reduced, resulting in increased efficiency.

BRIEF DESCRIPTION OF DRAWINGS

FIG. 3 is a view of a table illustrating downloaded historical information of repairs regarding parts;

FIG. 4 is a view of a table illustrating rankings of labor operation descriptions by cost within a group of repair areas; and FIG. 5 is a view of a table illustrating rankings of part descriptions by cost within each subclass of repair areas.

BEST MODE FOR CARRYING OUT THE INVENTION

The present invention provides a system and a method of reducing an amount of an unexpended vehicle warranty. The present invention efficiently identifies costs of warrantied parts and labor operations that, if reduced, would substantially reduce the amount of the unexpended warranty which, in turn, would provide a substantial amount of saving and efficiency.

Figure 1:
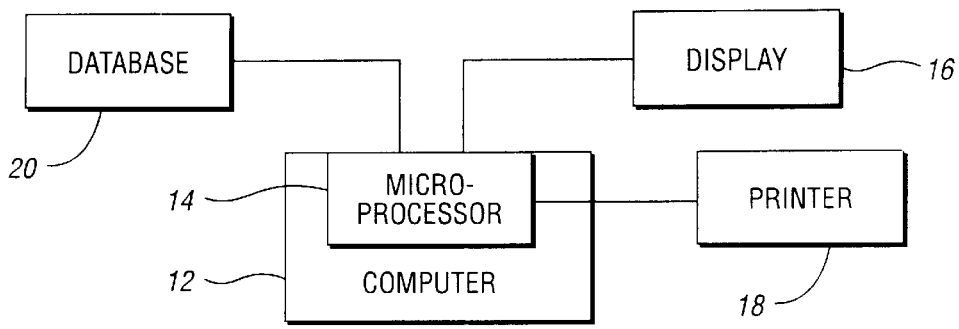
FIG. 1 is a schematic view of an overall system for reducing allocated vehicle warranty costs in accordance with one embodiment of the present invention.

FIG. 1 schematically illustrates a system 10 of the present invention used for reducing allocated vehicle warranty costs from a stored historical repair database containing information related to repair areas, repair costs, and repair descriptions. As shown in FIG. 1, system 10 includes a computer 12 having a microprocessor 14 and display 16, a printer 18, and a mainframe database 20. Computer 12 is in communication with printer 18 and main frame database 20.

Main frame database 20 provides a mechanism for storing historical repair information relating to repair areas, repair descriptions, and repair costs. For example, database 20 may be a database of a local access network (LAN) configured to store historical repair information therein with any suitable amount of storage capacity. For example, in one embodiment, database 20 may be included in an international business information system (IBIS) of the vehicle manufacturer LAN. The IBIS may be accessible through local or remote computer terminals as desired. The IBIS, when accessed, may have a configured main menu through which a user may interact in order to access database 20 in which information is stored.

Microprocessor 14 provides a mechanism for downloading the information into a computer-based program from main frame database 20. Microprocessor 14 further provides a mechanism for sorting the information by repair area to define groups of repair areas and a mechanism for ranking the information by repair costs. The microprocessor 14 also provides a mechanism for identifying within each group of repair areas those repairs having relatively significant cost within each respective group so that the repairs may be improved, and a mechanism for prioritizing the repairs with respect to the identified repair descriptions. Microprocessor 14 may be any suitable processor which is capable of fulfilling the functions mentioned above. For example, microprocessor 14 may be a processor having the trade name Pentium II™ manufactured by Intel Corporation of Santa Clara, Calif.

Display 16 provides a mechanism for displaying the information downloaded from main frame database 20. Display 16 may be any suitable computer monitor capable of communicating with microprocessor 14 to display the information. Printer 18 provides a mechanism for printing results of prioritizing the repairs to be improved in order to reduce the warranty costs. Printer 18 may be any conventional printer which is capable of printing results. For example, printer 18 may be a printer manufactured by the Hewlett Packard Company of Palo Alto, Calif.

Figure 2:
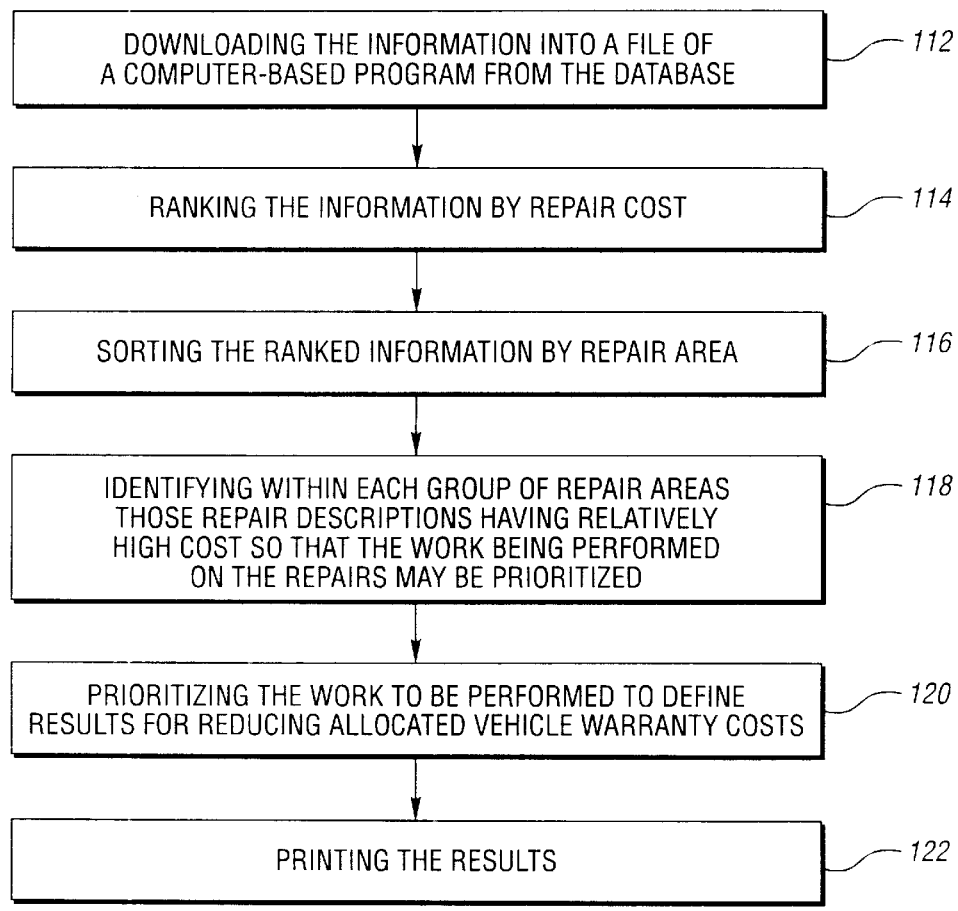
FIG. 2 is a flowchart illustrating one method of reducing allocated vehicle warranty costs with the system of FIG. 1.

FIG. 2 illustrates an example of a method of the present invention in accordance with system 10 of FIG. 1. In this embodiment, database 20 is configured to store historical repair information of repairs which relate to repair areas, repair descriptions, and repair costs. It is to be noted that vehicle repairs may relate to vehicle parts and/or labor operations. The historical repair information include information of repairs on manufactured vehicles which were under warranty for a predetermined time period and/or mileage usage. The information contain data regarding the repair areas (major area), such as engine, brakes, body, electrical, and transmission. The information further include detailed repair descriptions of parts and/or services performed with respect to the repair area. For example, repair descriptions may include services performed on the brake area such as disk brake rotor, brake shoes, brake drum, and parking brake. Moreover, the information include repair costs of each repair that is performed on each type of description, such as labor and part costs. Additionally, the information preferably includes a full service part number repaired or serviced. The information may also include number of repairs for each repair description, part name, and average cost for each repair.

The historical information may be inputted or uploaded into database 20 by any suitable means. For example, the information may be immediately inputted into database 20 by electronic transfer from a warranty system on warranty claims filed electronically from the location of service, such as a manufacture dealership or a licensed automobile service center.

When the amount of unexpended vehicle warranty is determined, microprocessor 14 opens a computer-based program pre-stored in computer 12 and downloads the information from database 20 into a named file of the computer-based program wherein the file is formatted for the program, as shown in box 112 of FIG. 2. The computer-based program may be a microprocessing spreadsheet program, such as the product of the trade name Excel™ manufactured by Microsoft Corporation of Redmond, Wash. Then, the file containing the downloaded information is accessed and opened. Once the file is opened, the downloaded information in the file is displayed by display 16 in a spreadsheet format depicting values representing the information of repairs related to repair areas, repair descriptions, and repair costs.

It is to be noted that the information may be downloaded into one or a plurality of files which may be accessed and opened for further manipulations. This may include multiple downloads and conventional microprocessing techniques, e.g. copy, cut, paste, in order to access the information as desired.

As shown in FIG. 3, the downloaded information is displayed in part. The information then is manipulated in order to rank the information by repair cost, as shown in box 114 of FIG. 2. As exemplified in FIG. 5, each repair area includes repair descriptions which are listed in accordance to descending repair costs. Each repair description is ranked by repair costs in descending order.

Next, the information is manipulated to sort or list the ranked information by repair area to define groups of repair areas having repairs ranked by cost, as shown in box 116. For example, each labor operation may be sorted by its labor operation description, as shown in FIG. 4. Each repair area group includes repair descriptions of vehicle areas upon which repairs had been performed. The repairs resulted in a repair cost wherein the payment of service had been drawn from the unexpended vehicle warranty reserve. The repair cost of each type of repair is also listed.

For example, as shown in FIG. 4, the repair description of the labor operation, "1102FPT—disk brake rotor—front machine on vehicle machine," is shown to have the highest ranking repair costs within the sorted brake area and has an overall repair cost ranking of 19. As desired, headings and titles are inserted throughout the spreadsheet for organizational purposes. For example, a "BRAKES" heading may be inserted to identify the repair area group representing repairs regarding brakes of the vehicles.

For repairs regarding vehicle parts, it is to be noted that the ranked information is preferably sorted by subclass of a repair area prior to the step of sorting by repair area. This may be accomplished by sorting the information by base part number of a full service part number. The full service part number, e.g., "F7DZ-1125-AA," provides a series of information relating to the respective repair. The full service part number typically includes a prefix, a base, and a suffix. In this example, the prefix ("F7DZ") provides the model year and the vehicle line. The base ("1125") provides the subclass of the repair area of the vehicle, e.g., rotor assembly of the brake repair area. Moreover, the suffix ("AA") may provide information of the part, such as the design level of the part. After the information is sorted by subclass of a repair area, the information then is preferably sorted based on the repair area, e.g., brake repair area.

For example, as shown in FIG. 5, each repair involving vehicle parts is sorted by subclass of its respective repair area. Thus, base part numbers having "1125" are sorted together within the brake repair area.

It is to be noted that the information may be manipulated by any suitable means through the computer-based program.

The information may be manipulated by the user or a programmed macro to manipulate the information as desired. For example, display 16 depicts selection keys of a menu bar on the respective spreadsheet with which the user may interact by using a conventional mouse or touch pad. With the mouse, the user may pull down selection keys in order to perform functions mentioned above. Thus, the downloaded information may, for example, be ranked by repair cost or sorted by repair area.

Sorting by repair area may be accomplished by highlighting the base number of the full service part number and selecting the proper selection keys with the mouse in order to separately list the repairs by repair area as desired. It is also to be noted that certain manipulations may be performed out of sequence without falling beyond the scope or spirit of the invention. For example, the step of ranking the repairs by repair costs may be performed after the step of sorting the information by repair area.

As shown in box 118 of FIG. 2, those repair descriptions having relatively high cost within each respective group are then identified as desired such that work to be performed on the repairs may be subsequently prioritized. The repair descriptions having relatively high cost may be defined as repairs which total a predetermined percentage of the repair costs within the respective repair area. For example, repairs totaling greater than approximately 85% of the repair costs of the brake repair area may be identified for subsequent prioritizations. In this example and as shown in FIG. 4, the top ranked brake labor operation repairs have a total repair cost which exceeds 85% of the costs within the brake repair area, and thus are identified as mentioned above. Other ways of identifying the repair descriptions do not fall beyond the scope or spirit of the present invention. That is, the repair descriptions having relatively high cost may be defined in other manners suitable to reduce the unexpended warranty reserve.

For repairs regarding labor operations, identifying the repair descriptions having relatively high cost may be accomplished by subtotaling the cost of each repair area and placing higher priority to those repair descriptions having relatively higher costs. The repair descriptions that are ranked the highest are given the highest priority.

For repairs regarding vehicle parts, it is preferred that each subclass of each repair area is subtotaled by cost. Then, each subtotal of each repair area is added to provide a total cost for each repair area. Thus, identifying those repair descriptions having relatively high cost of vehicle parts may be accomplished by identifying those repair areas having the highest total costs and applying priority thereto. Then, subclasses of those repair areas may be further prioritized based on the subtotal of each subclass.

Work to be performed on the repairs may include one or more assignments in order to reduce the unexpended warranty reserves. For example, the work may include improving the process by which to repair a part of a vehicle, redesigning a part of a vehicle, repairing a part rather than replacing the part, remanufacturing the part, deleting labor operations and/or reducing the repair time. Any other work that is suitable to reduce the unexpended warranty reserves may be implemented and would not fall beyond the scope or spirit of the present invention.

Then, the work to be performed on the repairs is prioritized based on repair cost, as shown in box 120 of FIG. 2. Preferably, the work to be performed on the repairs is prioritized by evaluating the subtotaled costs of each repair area or subclass of each repair area. The repairs having the highest costs are given the highest priority.

Alternatively, prioritizing the work may be accomplished by determining whether the work relates to a common cause repair or a special cause repair. Generally, repairs may be classified as common cause repairs and special cause repairs. Common cause repairs involve repairs that are common in past, present and future vehicle models. Thus, work to be performed on common cause repairs which would lower the cost of such repairs involves a significant number of vehicles and, in turn, a significant impact to reducing the unexpended warranty reserve. Special cause repairs involve repairs that affect only one vehicle models years. Thus, the work which lowers the cost of special cause repairs involves a less significant number of vehicles. Then, the work is given high priority, if the work is determined to relate to a common cause repair, or is given low priority, if the work is determined not to relate to a common cause repair.

Determining whether the work relates to a common cause repair or a special cause repair may be completed by any suitable manner. This may be completed by the user or by microprocessor 14. For example, if the repair involves the replacement of a part or service of a part, then the user may examine the full service part number mentioned above and determine whether the part or service thereof is common to several vehicle models or only to one or a few. If the part is common to several vehicle models and affects more than one model year, then the repair is determined to be a common cause repair, thus is given priority to the work. However, if the part is common only to one vehicle model year, then the repair is determined to be a special cause repair and is given low priority to the work. It is to be noted that other ways of determining whether the work relates to a common cause repair or a special cause repair may be used and do not fall beyond the scope or spirit of this invention. It is also to be noted that the determination may be applied to labor operations of a warrantied service.

After the work is prioritized, the user may perform manipulations, as stated above, to sort the high prioritized work above the low prioritized work to be performed, defining results for reducing allocated vehicle warranty costs. Then, the results may be printed using printer 18 which is in communication with computer 12 as shown in box 122.

After the work to be performed on the repairs is sorted and results printed, resources of the manufacturer may be directed toward such prioritized work in order to make deletions, changes and/or improvements to the repairs in order to significantly reduce the vehicle warranty reserve. Because deletions, improvements, and/or changes performed on the repairs would significantly impact the unexpended warranty reserve more so than improvements upon other repairs, resources should be directed to reducing repair costs of each of the prioritized repairs. This may be accomplished by any suitable cost reducing means, as mentioned above.

Although a specific embodiment of the invention is disclosed, modifications may be made by persons skilled in the art without departing from the invention. All such modifications and all equivalents are within the scope of the claims.

What is claimed is:

1. A method of reducing allocated vehicle warranty costs from a stored historical repair database of repairs containing information related to repair areas, repair descriptions, and repair costs, the method comprising:

downloading the information into a computer-based program from the database;

ranking the information by repair cost;

sorting the ranked information by repair area to define groups of repair areas having repairs ranked by cost; and identifying within each group of repair areas those repair descriptions having a relatively high cost within each respective group so that work to be performed on the repairs may be prioritized in accordance with the ranking in order to reduce the warranty costs.

2. The method of claim 1 further comprising:

prioritizing the work to be performed based on repair costs to define results for reducing allocated vehicle warranty costs; and printing the results.

3. The method of claim 1 further comprising:

prioritizing the work to be performed by determining whether the work relates to a common cause repair, wherein a common cause repair is a repair which relates to a plurality of vehicle model years;

applying high priority to the work, if the work is determined to relate to a common cause repair; and applying low priority to the work, if the work is determined not to relate to a common cause repair.

4. The method of claim 1 wherein sorting the ranked information includes:

listing the ranked information based on repairs regarding base part numbers of the repair areas to define subclasses areas; and grouping the information by base part numbers of each repair area to define the groups of repair areas.

5. The method of claim 4 wherein the step of identifying includes totaling the repair costs of each subclass area of each repair area.

6. The method of claim 5 wherein the step of identifying further includes totaling the repair costs of each group of repair areas.

7. The method of claim 1 wherein the step of identifying includes totaling the repair costs of each group of repair areas.

8. A method of reducing allocated vehicle warranty costs from a stored historical repair database of repairs, the database containing information related to repair areas, repair descriptions, and repair costs, the method comprising:

downloading the information into a file of a computer-based program from the database;

sorting the information by repair area to define groups of repair areas;

ranking by repair costs those repair descriptions within each repair area group; and identifying within each group of repair areas those repair descriptions having a relatively high cost within each respective group so that work to be performed on the repairs may be prioritized in accordance with the ranking in order to reduce the warranty costs.

9. The method of claim 8 further comprising:

prioritizing the work to be performed based on repair costs to define results for reducing allocated vehicle warranty costs; and printing the results.

10. The method of claim 8 further comprising:

prioritizing the work to be preformed by determining whether the work relates to a common cause repair;

applying high priority to the work, if the work is determined to relate to a common cause repair; and applying low priority to the work, if the work is determined not to relate to a common cause repair.

11. The method of claim 8 wherein sorting the information includes:

listing the information based on repairs regarding base part numbers of the repair areas to define subclasses areas; and grouping the information by base part numbers of each repair area to define the groups of repair areas.

12. The method of claim 11 wherein the step of identifying includes totaling the repair costs of each subclass area of each repair area.

13. The method of claim 12 wherein the step of identifying further includes totaling the repair costs of each group of repair areas.

14. The method of claim 8 wherein the step of identifying includes totaling the repair costs of each group of repair areas.

15. A system for reducing allocated vehicle warranty costs from a stored historical repair database containing information related to repair areas, repair descriptions, and repair costs, the system comprising:

a mechanism for downloading the information into a file of a computer-based program from the database;

a mechanism for ranking the information by repair costs;

a mechanism for sorting the information by repair area to define groups of repair areas having repairs ranked by cost; and a mechanism for identifying within each group of repair areas those repair descriptions having relatively high costs within each respective group so that work to be performed on the repairs may be prioritized in accordance with the ranking to reduce the warranty costs.

16. The system of claim 15 further comprising:

a mechanism for prioritizing the work to define results for reducing allocated vehicle warranty costs.

17. A method for reducing vehicle warranty costs, the method comprising:

receiving vehicle repair information including repair areas, repair descriptions and repair costs;

ranking the vehicle repair information by repair cost;

sorting the ranked vehicle repair information by repair area to define groups of repair areas having repairs ranked by cost; and prioritizing work to be performed to reduce vehicle warranty costs based upon the ranked and sorted vehicle repair information.

\* \* \* \* \*